Feb. 18, 1958     D. B. SPALDING     2,823,520
COMBUSTION EQUIPMENT, AND GAS TURBINE PLANT

Filed May 5, 1952     2 Sheets-Sheet 1

Feb. 18, 1958     D. B. SPALDING     2,823,520
COMBUSTION EQUIPMENT, AND GAS TURBINE PLANT
Filed May 5, 1952     2 Sheets-Sheet 2
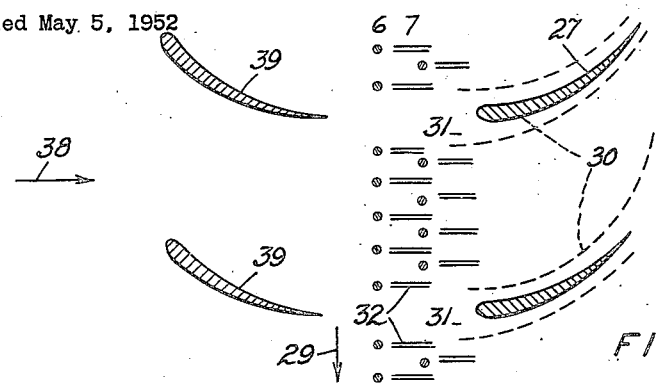
FIG. 6
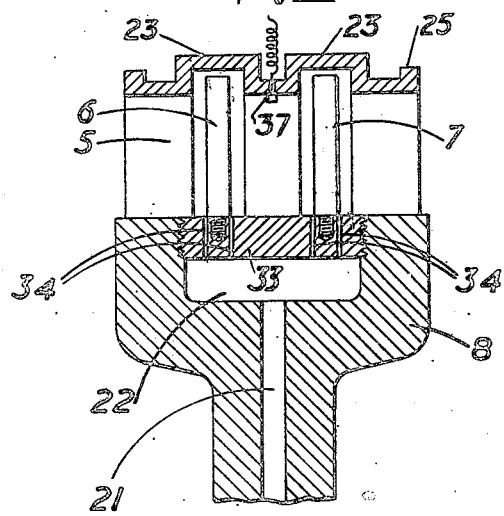
FIG. 4
FIG. 5
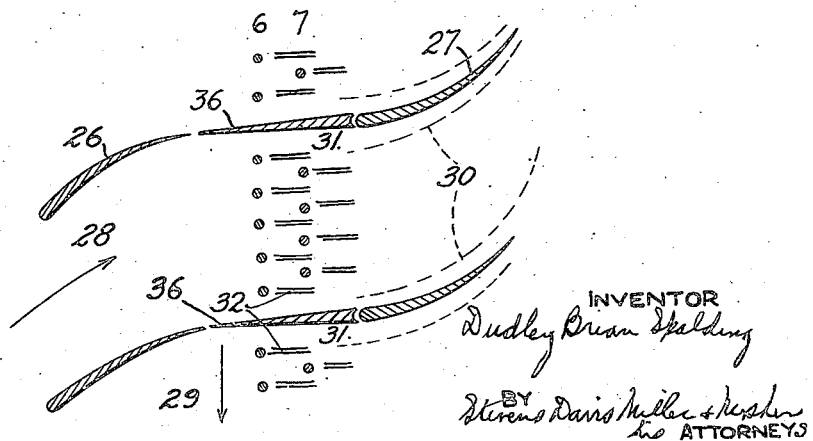

United States Patent Office 2,823,520
Patented Feb. 18, 1958

2,823,520

COMBUSTION EQUIPMENT AND GAS TURBINE PLANT

Dudley Brian Spalding, Cambridge, England

Application May 5, 1952, Serial No. 286,073

Claims priority, application Great Britain May 10, 1951

7 Claims. (Cl. 60—39.72)

The present invention relates to combustion equipment and to gas turbine plant in which such equipment is incorporated.

In my co-pending application Serial No. 209,378, filed February 5, 1951, there is disclosed combustion equipment in which liquid fuel is to be burned in an airstream through a duct which duct contains transverse rods or the like (or a grid formation made up of rods) to the outer surface of which fuel is supplied, for example by gravity, or by centrifugal force if the rod or like assembly is rotary. From experiment it has been found that, given rods or like members of suitable shape, fuel so supplied will burn stably in an airstream with a flame or flames extending substantially from the rods or equivalent members. It would appear that satisfactory combustion depends inter alia on the cross-sectional shape of the rods or the like, which may for convenience be called burner members.

The present invention provides combustion equipment for burning liquid fuel in an annularly ducted flow of high velocity gas comprising a rotatable body, at least one row of radial vaporizer rods of bluff section arranged peripherally around the body so as to extend transversely across such a duct and means for maintaining, in operation, a film of fuel over at least a part of the surface of each rod.

A centrifugally operated fuel distribution system may be built into the body, fuel being supplied to the radially inner ends of the rods. Where there are two axially separated rows of rods one may be of streamline section. Groups of rods may conveniently be made removable together.

A gas turbine plant embodiment of the invention comprises such combustion equipment as has been set out above and a turbine rotor assembled with its blading downstream of said rods so that the rotor and the body are rotatable together as a unit. A compressor rotor with its blading upstream of the rods may be assembled with the rod carrying body and the turbine rotor so that all three rotate together.

Preferably in such plant the rods are grouped circumferentially so that the hottest gases downstream thereof flow through the middle zone of the passages between adjacent turbine blades and so that cooler gases contact those blades.

The invention also provides a jet propulsion engine comprising an air compressor, a gas turbine drivably connected to said compressor, a nozzle downstream of the turbine through which gas is expanded to provide a propulsive thrust and combustion equipment between the compressor and the turbine which equipment is in the form of a wheel having at least one circumferential row of bluff section vaporizer rods extending radially from its rim across the annular duct between the compressor and turbine blading and having a centrifugal fuel feed to the radially inner ends of the rods so that, in operation, a film of fuel is maintained over at least a part of the surface of each rod, burning of the fuel being effected immediately downstream of the rods.

The invention will now be described, by way of example only, with reference to certain embodiments thereof some of which are shown in the accompanying drawings in which:

Figure 4 is a part of Figure 1 drawn to a larger scale.

Figure 5 is a view, similar to Fig. 2, of a modification.

Figure 6 is a diagram similar to Figure 2 but showing a modification of the arrangement shown in that figure.

Figure 1:
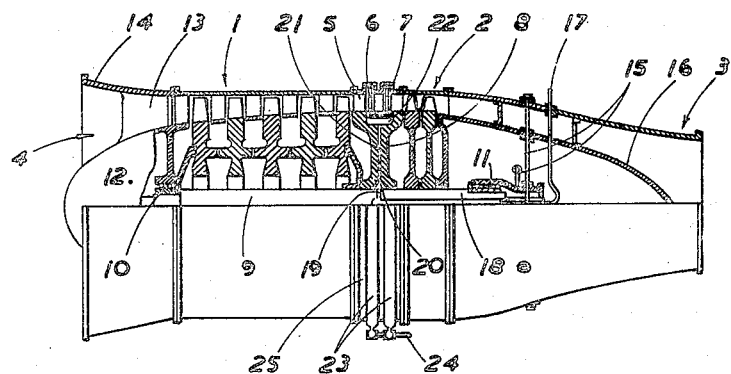
Figure 1 is a half sectioned elevation of a jet propulsion engine incorporating vaporizer rod combustion equipment.

Turning first to Figure 1, there will be seen a jet propulsion engine comprising an axial compressor 1, a two-stage gas turbine 2, and a nozzle 3 through which the gases expand to produce propulsive thrust. Air enters the engine through the annular intake 4 and is compressed. On leaving the compressor it passes through an annular duct 5 across which there are disposed two rows of rods 6 and 7 respectively. These rods are mounted radially around the periphery of a rotatable body 8 which is in the form of a wheel. This wheel, the compressor 1 and the turbine 2 are all mounted on the same shaft 9 which is supported in end bearings 10 and 11. Bearing 10 is in turn supported within the air intake deflector 12 which is positioned by radial struts 13 within the casing 14. The bearing 11 is supported by the radial rods 15 which also support the exhaust cone 16.

The rods 6 and 7 are arranged to have liquid fuel supplied to their inner ends. It has been found that with such rods of bluff section disposed across a duct through which a high velocity airstream passes a film of fuel provided over at least a part of the surface of each rod will vaporize and may be burnt in the wake of the rod. In this instance, fuel is supplied under pressure through the pipe 17 into the interior 18 of the shaft 9. The interior of this shaft communicates through a number of holes 19 with an annular chamber 20 in the hub of the wheel body 8. This annular chamber connects in turn via a number of radial passages 21 to an annular reservoir 22, almost at the rim of the wheel. This reservoir is closed by circumferentially extending plates 33 carrying the rods 6 and 7. There are holes 34 in the plates from the reservoir to the inner ends of each rod so that, in operation, fuel flows outwards under the influence of centrifugal forces from the annular chamber 20 in the central zone of the wheel to the inner ends of the rods and from thence to the rods of the cells. The outer ends of the rods extend into troughs 23 wherein any surplus fuel is collected from whence it is removed by pipe 24. The rods which are in two circumferential rows are grouped and mounted upon separately removable plates. The casing 25 surrounding this combustion equipment is quickly detachable so that any plate carrying a number of rods can be removed if necessary, without disturbing the remainder of the engine. Ignition means indicated at 37 in Fig. 4 are provided downstream of the rods to ignite the fuel for starting purposes.

In operation the compressor, the wheel and the turbine rotate together as a unit. In this case, the air flow leaving the compressor does not need to have its whirl component removed before reaching the combustion zone. As these three main components rotate together it may be convenient to fix the rods to the periphery of a short cylinder between the compressor and the turbine blading. In that case it is convenient to have an annular series of receptacles for fuel, or annular troughs, on the inside of the cylinder, which are connected through to the inner ends of the rods. Fuel can then be supplied by being sprayed under pressure from a fixed distributor arranged to direct the fuel into the receptacles or troughs.

Figure 2:
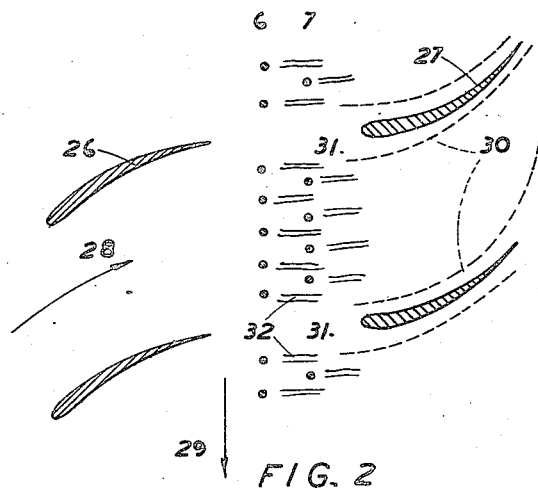
Figure 2 is a diagram illustrating fuel burning in the wake of groups of vaporizer rods.
Figure 3:
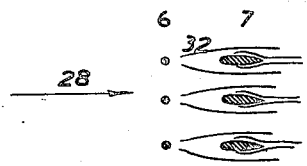
Figure 3 shows diagrammatically combustion equipment with a row of bluff section rods succeeded by a row of streamline section rods.

In Figure 2 there are shown two rows 6 and 7 of circular rods which are disposed between the last stage compressor blades 26 and the first stage turbine blades 27. Compressed air passes through the blades 26 in the direction of the arrow 28 and the whole assembly moves in the direction of the arrow 29. It will be understood that this is merely a small part of the whole combustion equipment. The rods are grouped so that the hottest gases leaving them flow through the middle zone 30 in the passages between adjacent turbine blades 27. Cooler gases pass through the spaces 31 between the groups of vaporizer rods and these prevent undue rise in temperature of the turbine blades 27. The rods of the two rows are staggered so that the flames 32 immediately downstream of each rod do not envelop the rod of the next row. In this figure, the rods are shown to be of circular section but they may be of some other bluff shape such as triangular, semi-circular or arrow head. An alternative arrangement is shown in Figure 3 in which the rods are not staggered and those of the second row in the direction of gas flow are of streamline section. The streamline rods provide vapor which burns in the flame supported by the vortices in the wake of the bluff circular section rods. This arrangement can be modified so that first row rods are of streamline section and the second row of bluff section, but in that case the vaporized fuel emanating from the first row would not burn until it reached a zone downstream of the second row.

The arrangements shown in Figures 2 and 3 have no rods located in line with the blades themselves and naturally as the rods and blades rotate as a unit the relative location is maintained during operation of the plant. As there are no rods in line with the turbine blades the compressor blading may be structurally united to the turbine blading assuming there are equal number of blades in each case. Alternatively, there may be walls indicated at 36 in Fig. 5 radial to the combustion wheel extending between a compressor blade trailing edge and the leading edge of a turbine blade. The combustion zone is then divided into a number of chambers which rotate with the turbine and forms a relatively simple structure.

In industrial gas turbine plants and in propeller jet engines it is common to have a separately rotatable power turbine. The invention is particularly applicable to a plant having a wheel carrying burner rods assembled immediately upstream of the power turbine. It is then preferable to employ stator blades upstream of the rods to impart a considerable degree of whirl to the gases immediately before they pass the rods. Figure 6 which is a modification of the arrangement shown in Figure 2 shows turbine blades 27 immediately downstream of two rows of burner rods 6 and 7. Upstream of the rods 6 and 7 there is a row of stator blades 39 arranged to impart a considerable degree of whirl to gases flowing in the direction of arrow 38. The rods and turbine together rotate in the direction of arrow 29.

The combustion systems as described may be embodied in gas turbine plant having centrifugal or similar compressors.

It will be appreciated from the above that combustion zone of a gas turbine plant may be very considerably reduced in size by use of embodiments of this invention. This advantage may be of considerable importance in some instances, particularly for example in the case of jet propulsion engines for aircraft. Figure 1 shows such an engine. The combustion zone is of much reduced axial length compared with the normal case where combustion chambers enclosing flame tubes are used. The diameter of a jet engine tends to be greatest at the combustion zone and this measurement also can be reduced by use of the invention.

What I claim is:

1. Apparatus for burning liquid fuel in a stream of combustion-supporting gas comprising an annular duct in which the stream of gas flows, a rotatable body mounted co-axially with the duct, a plurality of slender rod-like elements attached to the said body for rotation therewith and arranged in two axially spaced rows of peripherally spaced elements, each radially extending from the body transversely across the duct, the elements of the upstream row being of circular cross-section and constituting combined fuel vaporizer and flame-stabilizing baffles and the elements of the downstream row being of streamline cross-section and constituting fuel vaporizers, means for rotating the body, means for introducing fuel in a film to the outer surface of each element, which film during rotation of the body and the elements spreads under centrifugal force over at least part of the said outer surface and ignition means positioned in the duct immediately downstream of the said upstream row.

2. Apparatus for burning liquid fuel in a stream of combustion-supporting gas comprising an annular duct in which the stream of gas flows, a rotatable body mounted co-axially with the duct, a plurality of slender rod-like elements of bluff cross-section arranged in at least one row of peripherally spaced elements, each radially extending from the body transversely across the duct and constituting a combined fuel vaporizer and flame-stabilizing baffle, means for mounting the elements on the said body for rotation therewith in groups removable from the body, means for rotating the body, means for introducing fuel in a film to the outer surface of each element, which film during rotation of the body and the elements spreads under centrifugal force over at least part of the said outer surface and ignition means positioned in the duct immediately downstream of the said elements.

3. Gas turbine plant having combustion equipment comprising an annular duct in which a stream of gas flows to a turbine of the said plant, a rotatable body mounted co-axially with the said duct and positioned upstream of the turbine and rotatable therewith, a plurality of slender rod-like elements of bluff cross-section attached to the said body for rotation therewith and arranged in at least one row of peripherally spaced elements, each radially extending from the body transversely across the duct and constituting a combined fuel vaporizer and flame-stabilizing baffle, means for introducing fuel in a film to the outer surface of each element, which film during rotation of the body and the elements spreads under centrifugal force over at least part of the said outer surface and ignition means positioned in the duct immediately downstream of the said elements.

4. Gas turbine plant as claimed in claim 3 in which the said elements are spaced circumferentially around the periphery of the said rotatable body in groups, each group being separated by spacing wider than that between individual elements in the groups, the said wider spacing being in flow alignment with blades of the aforesaid turbine, so that hotter gas downstream of the said elements flows through middle regions of passages between adjacent turbine blades and so that cooler gas contacts the said blades.

5. Gas turbine plant having combustion equipment comprising an annular duct in which a stream of gas flows to a turbine of the said plant, a rotatable body mounted co-axially with the said duct and positioned upstream of the turbine and rotatable therewith, a plurality of slender rod-like elements of bluff cross-section attached to the said body for rotation therewith and arranged in at least one row of peripherally spaced elements, each radially extending from the body transversely across the duct and constituting a combined fuel vaporizer and flame-stabilizing baffle, means for introducing fuel in a film to the outer surface of each element, which film during rotation of the body and the elements spreads under centrifugal force over at least part of the said outer surface, ignition means positioned in the duct immediately downstream of the said elements and a plurality of radially and axially extending walls attached to the said rotatable body and positioned between adjacent elements in axial alignment with the blades of the said turbine, thereby separating the gas flow into a plurality of separate streams equal in number to passages between adjacent turbine blades.

6. Gas turbine plant having rotary compressor means, rotary turbine means and combustion equipment comprising an annular duct in which a stream of gas flows from the said compressor means to the said turbine means, a rotatable body mounted co-axially with the said duct and positioned upstream of the said turbine means and rotatable as a unit with the said compressor means and the said turbine means, a plurality of slender rod-like elements of bluff cross-section attached to the said body for rotation therewith and arranged in at least one row of peripherally spaced elements, each radially extending from the body transversely across the duct and constituting a combined fuel vaporizer and flame-stabilizing baffle, means for introducing fuel in a film to the outer surface of each element, which film during rotation of the body and the elements spreads under centrifugal force over at least part of the said outer surface, ignition means positioned in the duct immediately downstream of the said elements and a plurality of radially and axially extending walls attached to the said rotatable body and positioned between adjacent elements in axial alignment with the blades of the said turbine means and the blades of the said compressor means and each wall extending between the trailing edge of the associated compressor blade and the leading edge of the associated turbine blade, thereby separating the gas flow into a plurality of separate streams equal in number to passages between adjacent blades of the said compressor means and turbine means.

7. Gas turbine plant having combustion equipment comprising an annular duct in which a stream of gas flows to a turbine of the said plant, a rotatable body mounted co-axially with the said duct and positioned upstream of the turbine and rotatable therewith, a plurality of slender rod-like elements of bluff cross-section attached to the said body for rotation therewith and arranged in at least one row of peripherally spaced elements, each radially extending from the body transversely across the duct and constituting a combined fuel vaporizer and flame-stabilizing baffle, means for introducing fuel in a film to the outer surface of each element, which film during rotation of the body and the elements spreads under centrifugal force over at least part of the said outer surface, ignition means positioned in the duct immediately downstream of the said elements, and stator blading upstream of the said elements and so arranged as to impart a predetermined degree of whirl to the gas passing the elements.

References Cited in the file of this patent

UNITED STATES PATENTS

| | | |
|---|---|---|
| 2,326,072 | Seippel | Aug. 3, 1943 |
| 2,404,767 | Heppner | July 23, 1946 |
| 2,547,959 | Miller | Apr. 10, 1951 |
| 2,566,373 | Redding | Sept. 4, 1951 |

FOREIGN PATENTS

| | | |
|---|---|---|
| 568,163 | Germany | Mar. 1, 1929 |